(12) United States Patent
Walker et al.

(10) Patent No.: US 6,516,006 B1
(45) Date of Patent: Feb. 4, 2003

(54) SELF-ADJUSTING CLOCK PHASE CONTROLLED ARCHITECTURE

(75) Inventors: Robert M. Walker, Rougemont, NC (US); Stephen M. Camacho, Durham, NC (US); George W. Alexander, Durham, NC (US)

(73) Assignee: Mitsubishi Electric and Electronics U.S.A., Inc., Cypress, CA (US)

( * ) Notice: Subject to any disclaimer, the term of this patent is extended or adjusted under 35 U.S.C. 154(b) by 0 days.

(21) Appl. No.: 09/250,161

(22) Filed: Feb. 16, 1999

(51) Int. Cl.[7] .................................................. H04J 3/06
(52) U.S. Cl. ...................... 370/503; 370/516; 370/522; 375/356; 375/357; 375/371
(58) Field of Search ................................. 370/503, 507, 370/508, 509, 510, 512, 516, 517, 522; 375/220, 355, 356, 357, 359, 362, 371, 354

(56) References Cited

U.S. PATENT DOCUMENTS

| 4,119,796 | A |   | 10/1978 | Jones ........................ 178/69.1 |
| 4,604,582 | A |   | 8/1986  | Strenkowski et al. ......... 328/55 |
| 5,081,655 | A |   | 1/1992  | Long ........................... 375/119 |
| 5,410,570 | A |   | 4/1995  | Ladha et al. ................. 375/373 |
| 5,509,037 | A |   | 4/1996  | Buckner et al. ............. 375/371 |
| 5,509,038 | A |   | 4/1996  | Wicki ........................... 375/371 |
| 5,515,403 | A | * | 5/1996  | Sloan et al. .................. 375/371 |
| 5,553,104 | A |   | 9/1996  | Takashi et al. .............. 375/373 |
| 5,577,075 | A |   | 11/1996 | Cotton et al. ................ 375/356 |
| 5,592,519 | A |   | 1/1997  | Honaker, Jr. ................. 375/373 |
| 5,638,410 | A |   | 6/1997  | Kuddes ........................ 375/357 |
| 5,668,830 | A | * | 9/1997  | Georgiou et al. ............ 370/517 |
| 5,673,415 | A |   | 9/1997  | Nguyen et al. .............. 395/476 |
| 5,687,202 | A |   | 11/1997 | Eitrheim ...................... 375/376 |
| 5,712,882 | A |   | 1/1998  | Miller ........................ 375/356 |
| 5,940,608 | A | * | 8/1999  | Manning ...................... 395/558 |

* cited by examiner

*Primary Examiner*—Douglas Olms
*Assistant Examiner*—Shick Hom
(74) *Attorney, Agent, or Firm*—Burns, Doane, Swecker & Mathis, L.L.P.

(57) ABSTRACT

A self-adjusting path is created by utilizing a phase detector and modifying a clock path and a data path to enable the passing of data in either phase of the clock. The new input path is controlled by the output of the phase detector. Each time a command is issued, the phase of the clock is detected and latched. The phase of the clock at the time the command issues is thus captured and can propagate through the pipeline along with the data. Accordingly, each stage along the data path can be synchronized to a different phase of the clock to reduce data corruption.

18 Claims, 4 Drawing Sheets

SELF-ADJUSTING CLOCK PHASE CONTROLLED ARCHITECTURE

BACKGROUND OF THE INVENTION

1. Technical Field

The present invention relates to digital integrated circuits, and more particularly to methods and systems for providing a dynamically self-adjusting clocking scheme to transfer data along a pipeline efficiently.

2. Background Art

Digital circuit applications rely on proper coordination between timing domains to operate correctly. Different timing domains are marked by the use of disparate clock rates. For instance, external data is typically received at a clock rate considerably higher than the rate of the internal clock. This difference in clock rates poses operational problems that could result in the corruption of data. The ability to quickly resolve this disparity is desirable because processing delays can be minimized resulting in more efficient transfer of data.

In some conventional approaches, phased-lock loops (PLL) are employed to resolve the disparate timing domains in which a reference signal is locked on an incoming clock signal. The reference signal is then divided to produce a lower speed clock, if desired. PLLs conventionally possess a voltage-controlled oscillator (VCO), charge pump, and filter—among other components. The variety and number of components make their use relatively costly compared to a conventional clock recovery scheme that utilizes more fundamental components (e.g., flip-flops and logic gates). As a result, other schemes have been developed. One such common scheme is a single-phased clock approach.

FIG. 1 shows a single-phased clocking arrangement, in which reconciliation between two clock signals is performed without a PLL. The single-phased clocking circuit 100 possesses "n" number of stage circuits (103, 107, 113), with 113 designating the nth stage circuit. Data enters the pipeline via an input buffer 101. The input buffer 101 couples to a first stage circuit 103. The first stage circuit 103 comprises a switching transistor, which supplies the data to logic 105 in response to an internal clock signal (CLK). The clock signal drives the transistors of stage circuits 107 and 113, moving the data through "n" stages of logic (e.g., 105, 109, and 111) to the data out interface 115. The operation of the single-phased clocking circuit 100 is explained with respect to FIG. 2.

As shown in FIG. 2, two clock signals are involved in the transfer of data along a pipeline. The incoming data is received by the input buffer 101 at an external clock rate. The external clock signal (EXTCLK) is typically faster than an internal clock signal (INTCLK). In this example, the external clock rate is twice that of the internal clock rate. Under the single-phased clocking scheme, data can enter only when the clock edges of the EXTCLK and INTCLK signals are phase aligned. Thus, idle states (i.e., padding) are required to provide proper alignment, which is a major disadvantage in terms of the rate of data transfer (i.e., bandwidth). Viewed in another way, an application may be forced to use only even or odd clock cycles for data transfer.

A first command (external data start) is received at clock cycle 201, signifying the arrival of data A. Another command (data to internal pipeline) is issued (203), causing the transfer of data A into input buffer 101. At this point, the EXTCLK signal and the INTCLK signal are properly aligned with both signals exhibiting a rising edge. As a result, data A in the input buffer can enter the pipeline. The diagram of DATA1 reflects a "snap-shot" of the output of the first stage circuit 103. Because the two clocks exhibit the same phase, data A is valid. Another external data start command issues at 205, signifying the entry of data B. Data B is supplied to the input buffer 101 at 207. The clock signals coincide once again at clock cycle 207, in which data B can enter the data path. It is seen at 209 that when no operation is issued (i.e., idle state), the clock edges are out of phase. However, the next command to transfer the data into the pipeline, at 213, encounters a situation where the EXTCLK signal and the INTCLK signal are out of phase. No adjustment of the internal clock (i.e., reference clock) in response to this information can be made under this scheme. As a result, data cannot be transferred during this clock cycle.

At 211, another external data command associated with data C issues. Data C is then stored in the input buffer 101. Consequently, data C associated with the third command cannot enter the data path, but has to wait until the next time the clock signals are aligned, for example, at 207. The data is therefore corrupted, as evident by the invalid data indication in DATA1. Because there are periods when the data are prohibited from entering the pipeline, idle states are necessary to pad the clock cycles, resulting in inefficient transfer of data.

DISCLOSURE OF THE INVENTION

There is a need for an arrangement that enables passing of data on any phase of the clock in a pipeline architecture of the type described. A need also exists for an arrangement in this architecture that has the flexibility to dynamically align a wide range of clock rates. There is also a need for an arrangement that avoids use of a PLL for clock rate adjustment in the described environment.

These and other needs are attained by the present invention, by a phase detector together with data input and clock path modification to create a novel self-adjusting path. The input path, controlled by the output of the phase detector, which permits passing of data on either phase of the clock signal. Phase information thus produced is captured and can propagate through the pipeline along with the received data.

In accordance with one aspect of the present invention, a clock alignment circuit comprises a phase detector for detecting a phase difference between a reference clock signal and a received command signal and correspondingly outputting a first phase signal. A plurality of clock generator circuits is arranged in a sequential order, with a first clock generator circuit, connected to the phase detector, supplying an adjusted reference clock signal and a second phase signal to a second clock generator circuit in response to the reference clock signal and the first phase signal. A plurality of stage circuits is arranged along a pipeline. A first stage circuit controls the transfer of data associated with the received command signal along the pipeline in response to the adjusted reference clock signal. This self-adjusting clocking scheme advantageously eliminates idle states within the clock cycles.

Another aspect of the invention provides a method for aligning the phase of a reference clock signal with that of a received command signal. The method comprises detecting a phase difference between the reference clock signal and the received command signal, and producing a first phase signal based upon the detected phase difference. An adjusted reference clock signal and a second phase signal are produced in response to the first phase signal and the reference clock signal. Received data associated with the received command signal is transferred in response to the adjusted reference clock signal. The described method advantageously increases the data transfer rate.

Additional advantages and novel features of the present invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

The clocking arrangement described herein focuses on applications that use an internal clock signal as well as an external clock signal to propagate data down a pipeline. It will become apparent, however, that the present invention is also applicable to other clocking scenarios where the clocks are operating at different rates (e.g., two internal clock signals that exhibit different frequencies).

Figure 1:
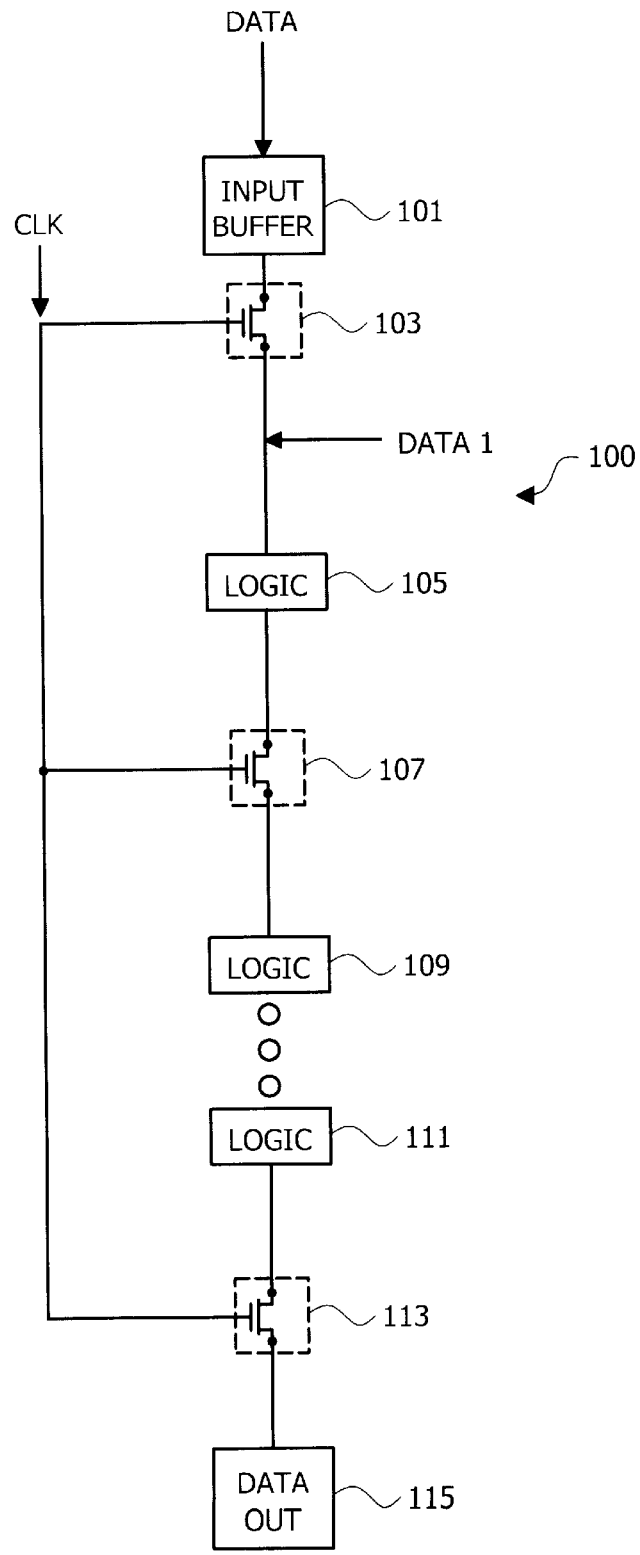
FIG. 1 is a block diagram of a conventional single-phased clocking arrangement.
Figure 2:
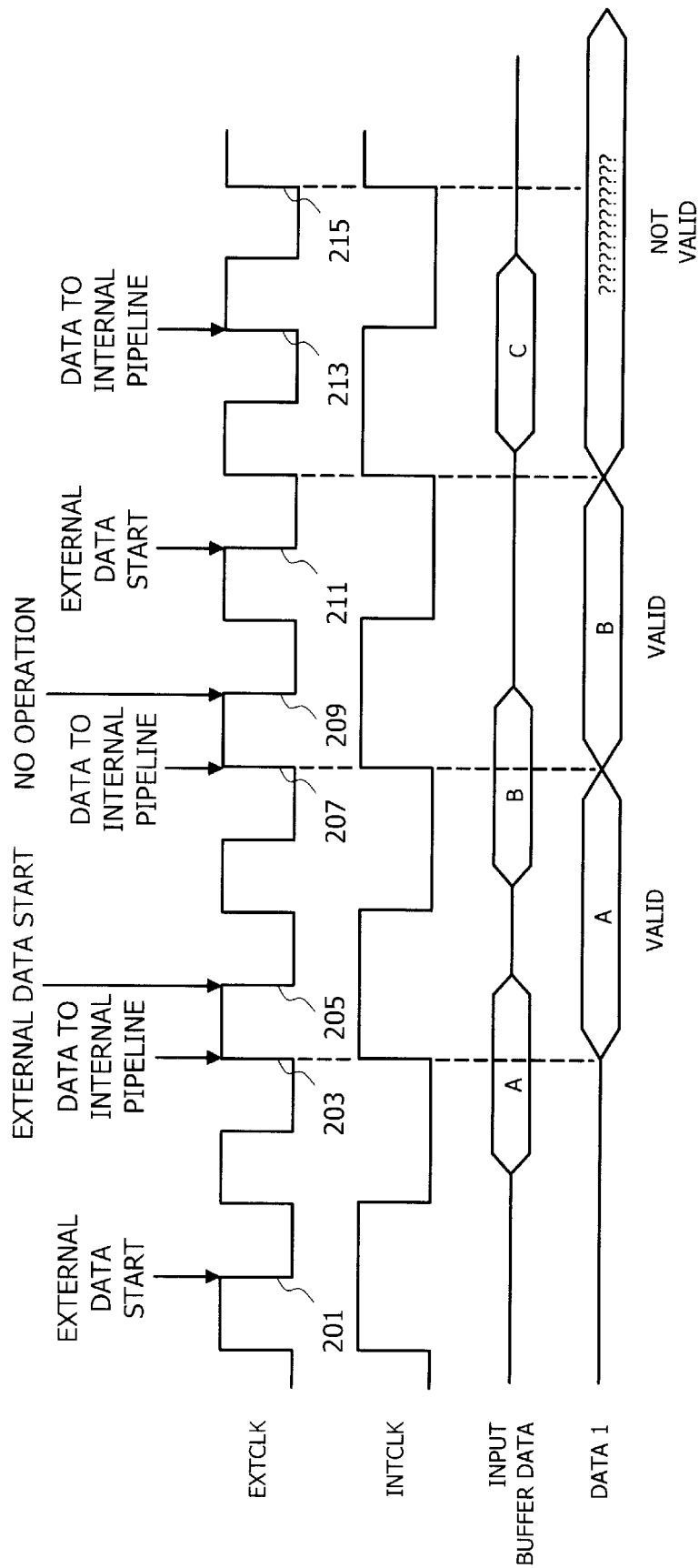
FIG. 2 is a signal diagram showing the operation of the single-phased clocking scheme of FIG. 1.
Figure 3:
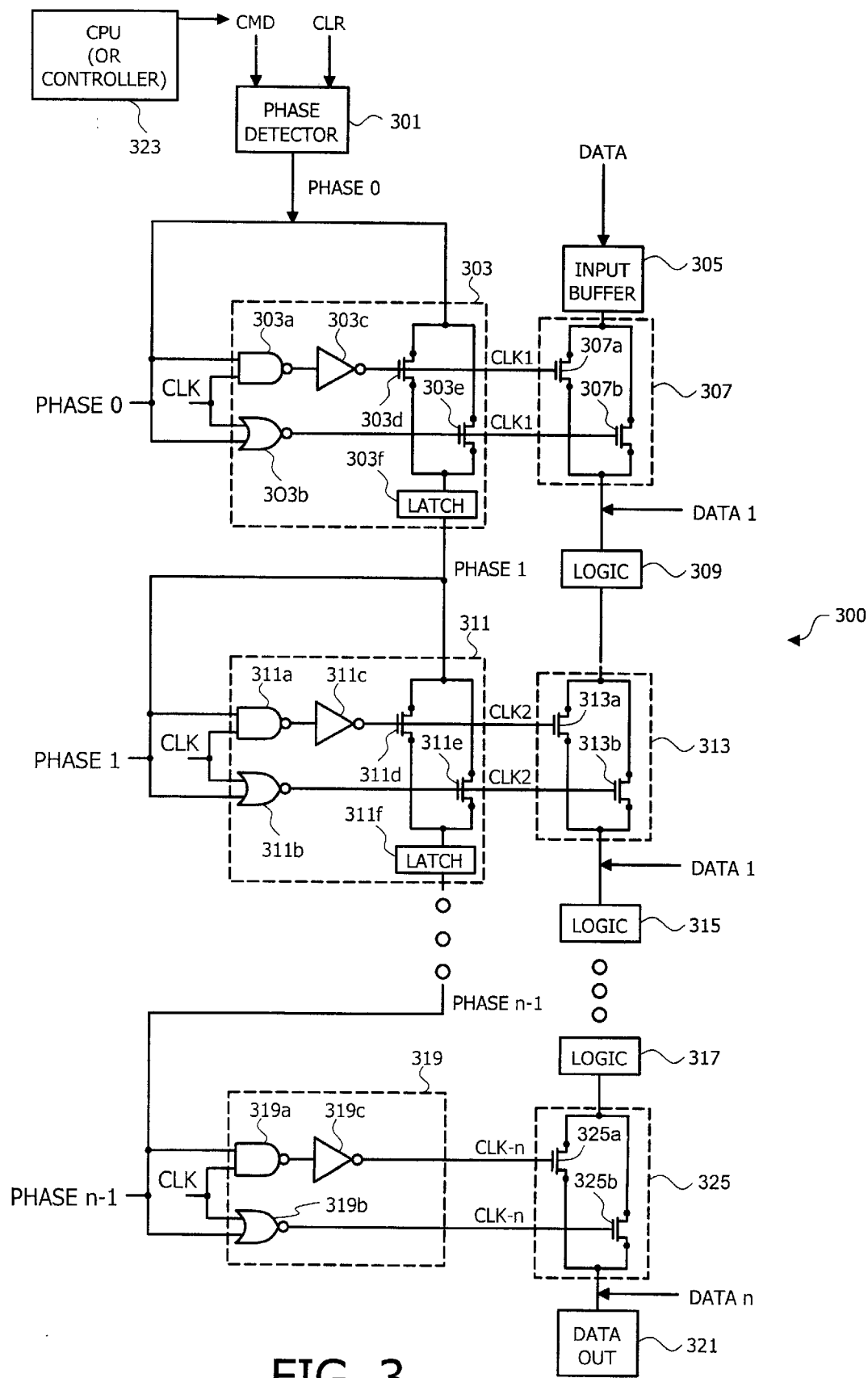
FIGS. 3 is a block diagram of a self-adjusting clock arrangement in accord with an embodiment of the present invention.

FIG. 3 shows a preferred embodiment of the present invention in which data, typically from memory, enters the pipeline based upon a novel self-adjusting clocking scheme. By using a phase detector 301 and modifying the input path to be able to pass data on either phase of the clock, a self-adjusting path is created. The phase detector 301 controls the input path such that each time a command is issued from the central processing unit (CPU) or controller 323, the phase difference between the command signal (which operates under a different clock) and the internal clock signal (CLK) is detected. This phase information is passed through the pipeline along with the data.

A command (e.g., read operation) enters the phase detector 301 along with the clock signal CLK. The phase detector 301 determines the phase of CLK with respect to the command signal and outputs a Phase0 signal, which indicates the phase alignment with the command signal. Concurrent with the issuance of the command, data is supplied to an input buffer 305. The Phase0 signal and CLK signal are inputted to a first clock generator circuit 303, which receives these signals via two paths: the first path includes a NAND gate 303a and an inverter 303c, and the second path has a NOR gate 303b. The NAND gate 303a connects to an inverter 303c, which outputs to transistor 303d. Transistor 303d is turned ON when the Phase0 and CLK signals are both HIGH, thus passing the Phase0 signal to a latch 303f. The NOR gate 303b, which is the second path, turns transistor 303e ON when both Phase0 and CLK signals are LOW. The outputs of the first clock generator circuit 303 are a Phase1 signal to the next clock generator circuit 311 and a CLK1 signal to the first Stage circuit 307.

The first stage circuit 307 has two transistors 307a and 307b. These transistors 307a and 307b, in response to the CLK1 signal, provide dual data paths to logic 309. Logic 309 may perform any number of operations, such as arithmetic operations, on the data. The output of logic 309 is supplied to a second stage circuit 313, which comprises transistors 313a and 313b. These transistors 313a and 313b are responsive to clock signal, CLK2, that is generated by a second clock generator circuit 311.

The second clock generator circuit 311 is identical to the first clock generator circuit 303 in both operation and implementation. A NAND gate 311a, which receives the Phase1 signal and the internal clock signal, is connected to an inverter 311c to produce a signal that controls transistor 311d. In addition, a NOR gate 311b manipulates transistor 311e in response to the Phase1 signal and the internal clock signal. These transistors 311d and 311e output to latch 311f that in turn supplies a Phase2 signal to a third clock generator circuit (not shown). Correspondingly, the second Stage circuit 313 outputs data to logic 315.

The "pair" of stage circuit and clock generator circuit repeats down the data pipeline through the nth stage. The nth clock generator circuit 319 differs from the other clock generator circuits in that a latch and associated transistors are not required. This clock generator circuit 319, however, produces a clock signal, CLK-n, to an nth stage circuit 323. Transistors 323a and 323b form the nth stage circuit 323, which outputs to a data output interface 321 in response to the data from logic 317 and the CLK-n signal.

Figure 4:
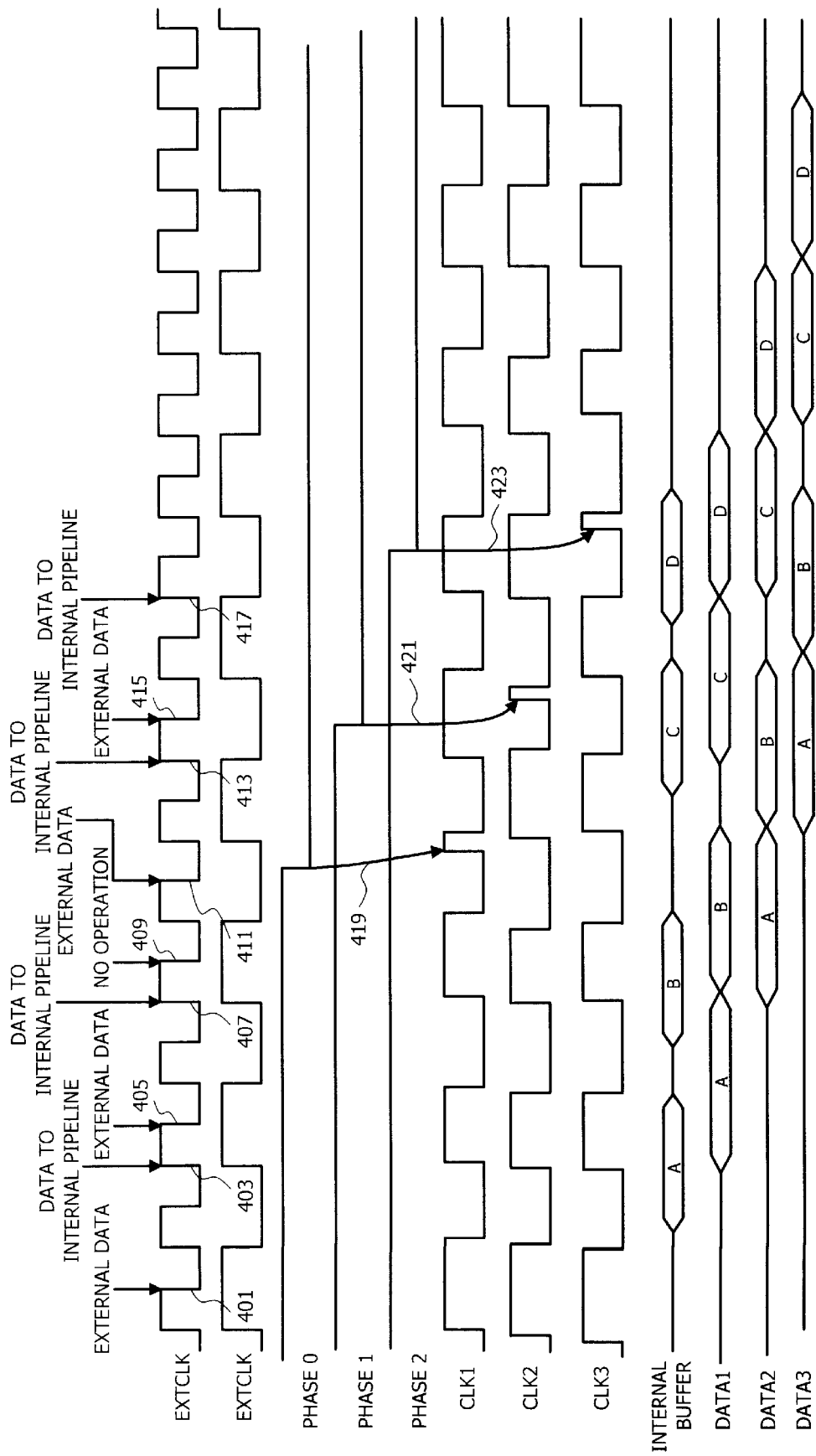
FIG. 4 is a signal diagram showing an exemplary data transfer according to an embodiment of the present invention of FIG. 3.

FIG. 4 shows a timing diagram that illustrates the principle of operation of the clocking scheme in accord with the present invention, involving an exemplary three stage arrangement (i.e., n equals 3). Preferably, the external clock signal (EXTCLK) has a frequency that is an integer multiple of the internal clock signal (INTCLK). In this example, the EXTCLK signal has a frequency that is twice that of the INTCLK signal. However, exemplary applications employ an EXTCLK signal of about 800 MHz and an INTCLK signal of about 200 MHz. In this figure, Phase0, Phase1, and Phase2 correspond to the input signals of the first clock generator circuit 303, second clock generator circuit 311, and third clock generator circuit 319, respectively. For the purposes of illustration, three snapshots of the data pipeline are taken at DATA1, DATA2, and DATA3.

When the first external data (i.e., A) arrives at the first falling edge 401 of the EXTCLK signal, the phase detector 301 outputs a Phase0 signal that is HIGH. Data A is stored in input buffer 305. At time 401 or 403, a command issues from, for example, a CPU or controller 323 to move data A along the pipeline by first entering the first stage circuit 307. The command can be issued on any clock edge from 401–403; the actual timing is a design issue. At clock cycle 401 or 403, the clock edges of EXTCLK and INTCLK signals are in phase; thus, data A can be transferred to the first stage circuit 307. The propagation of data A is controlled by the CLK1 signal of the first clock generator circuit 303. The first clock generator circuit 303 also outputs a Phase1 signal, which is HIGH. Next, data B arrives at 405 and received by the input buffer 305 at time 407. At this clock cycle, the INTCLK signal is still in phase with the EXTCLK signal. Accordingly, data B is passed from the first stage circuit 307 to logic 309, as evident by the DATA1 signal diagram. Data A has been transferred by the second Stage circuit to logic 315.

At clock cycle 409, an idle state exists—i.e., no operations at CLK cycle 411. The external clock signal and the internal clock signal are out of phase when an external command is given. As a result, the Phase0 signal goes LOW, causing the phase of CLK1 to invert (419) so that the CLK1 signal is corrected to once again be in phase with the EXTCLK signal. In the conventional single-clock scheme, no data may enter the pipeline when the clocks are out of phase, resulting in wasted clock cycles. However, the present invention adjusts the clock signal path accordingly, increasing the amount of data transferred.

At time 411, data C arrives and is inputted to the input buffer 305 at 413. It should be observed that although the INTCLK signal is out of phase with the EXTCLK signal, the adjusted CLK1 signal, caused by the deassertion of the Phase0 signal (419), is in phase with that signal, which permits data C to be transferred to logic 309 from the first Stage circuit 307. The phase information contained in the Phase0 signal is conveyed to the Phase1 signal, which causes the CLK2 signal to invert to align with the EXTCLK signal (421).

Data D arrives at 415 and enters input buffer 305 at 417, when the appropriate command issues. The data is valid because the CLK1 signal is in phase with the EXTCLK signal. The phase information from Phase0 has now reached the third clock generation circuit 319, thereby altering the phase of the CLK3 signal. The Phase2 signal deasserts to adjust the CLK3 signal as a result of the data to internal pipeline command at 417.

The present invention therefore enables the efficient transfer of data down a data pipeline irrespective of the phase of the internal clock. The phase of the internal clock can be dynamically changed. As a command is given, the phase of the clock is sampled and adjusted if needed. This arrangement eliminates the need for idle states as padding and any requirement that forces an application/user to use only even or odd clock cycles. Thus, a higher bandwidth is achieved.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A clock alignment circuit comprising:

a phase detector for detecting a phase difference between a reference clock signal and a received command signal and correspondingly outputting a first phase signal;

a plurality of clock generator circuits arranged in a sequential order, a first clock generator circuit connected to the phase detector supplying an adjusted reference clock signal and a second phase signal to a second clock generator circuit in response to the reference clock signal and the first phase signal; and a plurality of stage circuits arranged along a pipeline, a first stage circuit controlling transfer of data associated with the received command signal along the pipeline in response to the adjusted reference clock signal.

2. The clock alignment circuit as in claim 1, further comprising an input buffer coupled to the first stage circuit for storing the data.

3. The clock alignment circuit as in claim 1, wherein the received command signal has a frequency that is derived from an external clock source, and the reference clock signal originates from an internal clock source.

4. The clock alignment circuit as in claim 1, wherein the received command signal has a frequency that is an integer multiple of a frequency of the reference clock signal.

5. The clock alignment circuit as in claim 1, wherein the received command signal originates from a central processing unit (CPU).

6. The clock alignment circuit as in claim 1, wherein the received command signal originates from a controller.

7. The clock alignment circuit as in claim 1, wherein the first clock generator circuit comprises:

an inverter;

a NAND gate for outputting a signal to the inverter in response to the first phase signal and the reference clock signal;

a latch circuit for latching onto the reference clock signal; and a NOR gate for outputting a signal to the latch circuit in response to the first phase signal and the reference clock signal.

8. A method for aligning phase of a reference clock signal with phase of a received command signal, the method comprising:

detecting a phase difference between the reference clock signal and the received command signal;

producing a first phase signal based upon the detected phase difference;

producing an adjusted reference clock signal and a second phase signal in response to the first phase signal and the reference clock signal; and transferring received data associated with the received command signal in response to the adjusted reference clock signal.

9. The method as in claim 8, wherein the received command signal is supplied in accordance with an external clock source and the reference clock signal originates from an internal clock source.

10. The method as in claim 8, wherein the received command signal has a frequency that is an integer multiple of a frequency of the reference clock signal.

11. The method as in claim 8, wherein the received command signal originates from a central processing unit (CPU).

12. The method as in claim 8, wherein the received command signal originates from a controller.

13. A method for aligning phase of a reference clock signal with phase of a received command signal, the method comprising the steps of:

detecting a phase difference between the reference clock signal and the received command signal;

producing a first phase signal based upon the detected phase difference;

producing at least one adjusted reference clock signal and at least one additional phase signal in response to the first phase signal and the reference clock signal; and transferring received data associated with the received command signal along a pipeline of stage circuits, each stage circuit controlling the transfer of data in response to the at least one adjusted reference clock signal produced in response to the reference clock signal and the at least one additional phase signal associated with a prior stage circuit in the pipeline.

14. The method of claim 13, further comprising the step of:

buffering the received data transferred along the pipeline of stage circuits.

15. The method of claim 13, wherein the received command signal associated with received data is derived from an external clock source, and the reference clock signal is derived from an internal clock source.

16. The method of claim 15, wherein a frequency of the external clock source is an integer multiple of a frequency of the internal clock source.

17. The method of claim 13, wherein the received command signal originates at a central processing unit (CPU).

18. The method of claim 13, wherein the received command signal originates at a controller.

* * * * *

UNITED STATES PATENT AND TRADEMARK OFFICE
CERTIFICATE OF CORRECTION

PATENT NO.     : 6,516,006 B1
DATED          : February 4, 2003
INVENTOR(S)    : Robert Walker et al.

It is certified that error appears in the above-identified patent and that said Letters Patent is hereby corrected as shown below:

Column 4,
Line 31, delete "323" and insert therefore -- 325 --; and
Line 32, delete "323$a$" and insert therefore -- 325$a$ --;
Line 32, delete "323$b$" and insert therefore -- 325$b$ --; and
Line 32, delete "323" and insert therefore -- 325 --.

Signed and Sealed this

Twelfth Day of August, 2003

JAMES E. ROGAN
*Director of the United States Patent and Trademark Office*